W. SUGGS.
BOUQUET HOLDER.
APPLICATION FILED AUG. 10, 1916.
1,206,165.
Patented Nov. 28, 1916.
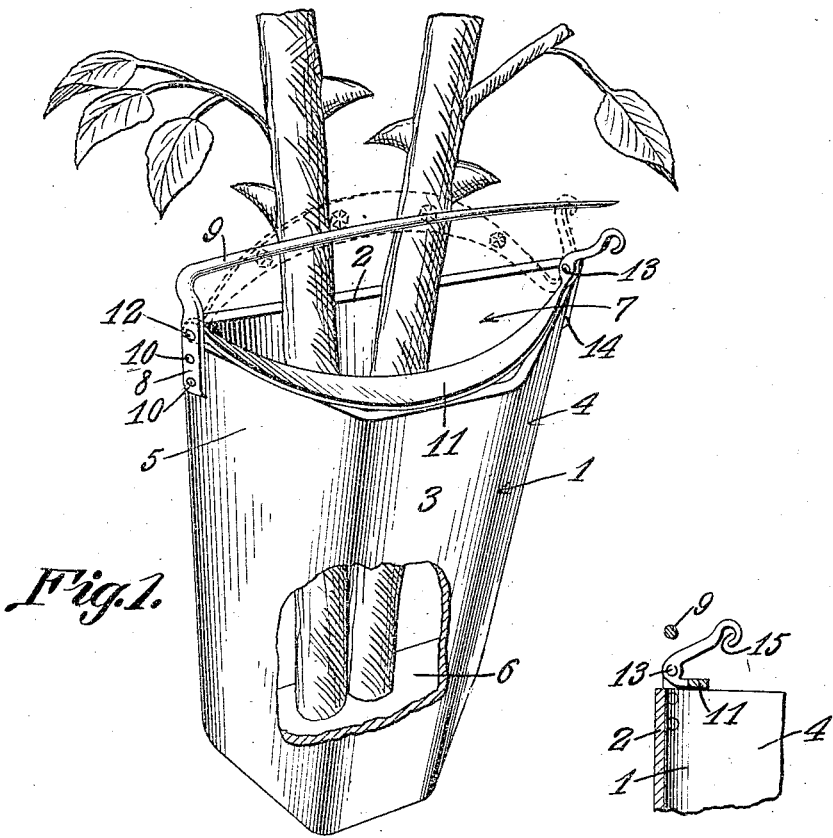
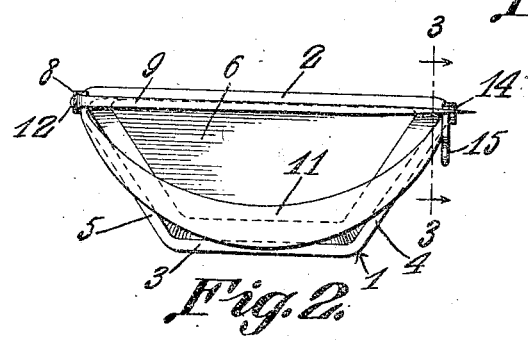
Witnesses
John M. Dobie
Wm. H. Mulligan
Willia Suggs, Inventor
By Richard B. Owen
Attorney

UNITED STATES PATENT OFFICE.

WILLIA SUGGS, OF HOLLY SPRINGS, MISSISSIPPI, ASSIGNOR OF ONE-HALF TO BUCK SUGGS, OF HOLLY SPRINGS, MISSISSIPPI.

BOUQUET-HOLDER.

1,206,165.  Specification of Letters Patent.  Patented Nov. 28, 1916.

Application filed August 10, 1916. Serial No. 114,994.

*To all whom it may concern:*

Be it known that I, WILLIA SUGGS, a citizen of the United States, residing at Holly Springs, in the county of Marshall and State of Mississippi, have invented certain new and useful Improvements in Bouquet-Holders, of which the following is a specification.

This invention relates to a bouquet holder and the primary object of the invention is to provide a receptacle for the ends of cut flowers, the receptacle having means for fastening the stems of the flowers to prevent the same from being accidentally displaced from the receptacle.

A further object of the invention is the provision of a bouquet holder having a clasp for fastening the stems of the flowers and for suspending the receptacle in the desired position.

A further object of this invention is the provision of a bouquet holder which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which;

Figure 1 is a perspective view of the holder, greatly enlarged and showing the flower stems secured in the holder. Fig. 2 is a top plan view. Fig. 3 is a fragmentary vertical section on the line 3—3 of Fig. 2.

The receptacle comprises a body portion 1 which has the rear wall 2 and the front wall 3 of a comparatively lesser width than the rear wall and the front and rear walls are connected by the side walls 4 and 5 thereby effecting a receptacle shaped in the form of a trapezoid as clearly shown by Fig. 2 of the drawing. All of the side walls are tapered toward their lower ends where they are connected to the bottom 6 of the receptacle thereby causing the opening 7 at the top of the receptacle to be of a much greater area than is the bottom 6.

Fastened to the side wall 5 adjacent the rear edge thereof is the supporting arm 8 of the fastening clip pin 9. The arm 8 is fastened to the wall 5 by rivets or bolts 10 and the shank 9 of the clip pin is bent at right angles from the arm 8 and extends across the widest part of the opening 7 and is spaced considerably above the opening as clearly shown by the drawings.

A clip 11 is also provided, and is of semi-circular formation and has one end pivotally mounted on the pivot pin 12 carried by the arm 8 directly above the edge of the wall 5 of the receptacle. The opposite end of the clip 11 is pivotally mounted on the pintle 13 carried by the supporting lug 14 which is secured, as shown by Fig. 3 of the drawing, to the wall 4 of the receptacle. The clip 11 is extended beyond the pintle 13 and bent forwardly and has its terminal curved to provide the hook 15 which is adapted to engage the end of the clip pin 9 when the device is in operative position.

As clearly shown by Fig. 1 of the drawing, the stems of the flowers may be held within the receptacle by swinging the clip 11 on its pivot until it assumes the position shown by dotted lines after which the end of the clip pin 9 is caught in the hook 15 and since the pin 9 is slightly bowed and possesses a resiliency, the pin will hold the hook over in the position shown by dotted lines thereby causing the clip to tightly engage the stems of the flowers for preventing the displacement of the stems from the receptacle.

From the foregoing it will be observed that a very simple and durable bouquet holder has been provided, the details of which embody the preferred form. I desire it to be understood however, that slight changes in the minor details of construction may be made without departing from the spirit of the invention or the scope of the claims hereunto appended.

I claim:

1. A device of the character described comprising a receptacle, the rear wall of the receptacle being of a greater width than the front wall, a clip pivotally mounted at the top of the receptacle adjacent the edges of the said rear wall, the said clip being of semi-circular formation and adapted to rest upon the said front wall when in inoperative position.

2. A device of the character described comprising a receptacle, a clip member pivotally mounted at the top of the receptacle, one end of the said clip being extended and bent to provide a hook, and means for engaging the hook whereby the said clip may be held in operative position.

3. A device of the character described comprising a receptacle, a clip member pivotally mounted at the top of the receptacle, one end of the said clip being extended and bent to provide a hook, means for engaging the hook whereby the said clip may be held in operative position, the said means including a spring-bowed pin adapted to have its free end engaged with said hook.

4. A device of the character described comprising a receptacle, a clip pin secured to one side of the receptacle having a supporting arm vertically disposed and fastened to the receptacle, the said clip pin being disposed above the receptacle and extending across the opening therein, and a clip having a hook adapted to be caught into the free end of said pin for holding the same in operative position.

5. A device of the character described comprising a receptacle, a clip pin secured to one side of the receptacle having a supporting arm vertically disposed and fastened to the receptacle, the said clip pin being disposed above the receptacle and extending across the opening therein; a clip having a hook adapted to be caught into the free end of said pin for holding the same in operative position, and a suporting lug fastened to the opposite side of the receptacle and pivotally receiving one end of the said clip, the opposite end of the said clip being pivotally connected to the said standard.

In testimony whereof I affix my signature in presence of two witnesses:

WILLIA SUGGS.

Witnesses:
FRANK ALEXANDER,
E. C. WRIGHT.